United States Patent [19]
Ueno et al.

[11] Patent Number: 4,985,802
[45] Date of Patent: Jan. 15, 1991

[54] HIGH VOLTAGE THROUGH TYPE CAPACITOR AND MANUFACTURING METHOD THEREFOR

[75] Inventors: Katsunori Ueno, Osaka; Masayuki Aiga, Hyogo; Masafumi Kuroda, Himeji, all of Japan

[73] Assignee: Sanyo Electric Co., Ltd., Moriguchi, Japan

[21] Appl. No.: 409,474

[22] Filed: Sep. 19, 1989

[30] Foreign Application Priority Data

| Sep. 20, 1988 | [JP] | Japan | 63-122915 |
| Nov. 16, 1988 | [JP] | Japan | 63-290438 |
| Nov. 17, 1988 | [JP] | Japan | 63-291429 |
| Nov. 18, 1988 | [JP] | Japan | 63-292843 |
| Nov. 18, 1988 | [JP] | Japan | 63-292846 |
| Nov. 18, 1988 | [JP] | Japan | 63-292847 |
| Nov. 24, 1988 | [JP] | Japan | 63-296932 |
| Dec. 22, 1988 | [JP] | Japan | 63-324607 |

[51] Int. Cl.⁵ .................... H01G 4/42; H01G 7/00
[52] U.S. Cl. .................... 361/302; 29/25.42
[58] Field of Search .................... 361/302; 29/25.42; 427/387; 523/218

[56] References Cited

U.S. PATENT DOCUMENTS

| 4,072,635 | 2/1978 | Jeram | 523/218 |
| 4,257,936 | 3/1981 | Matsumoto et al. | 427/387 X |
| 4,370,698 | 1/1983 | Sasaki | 361/302 X |
| 4,814,938 | 3/1989 | Arakawa et al. | 361/302 |

Primary Examiner—Donald A. Griffin
Attorney, Agent, or Firm—Armstrong, Nikaido, Marmelstein, Kubovcik & Murray

[57] ABSTRACT

High voltage through type capacitor comprising includes a cylindrical dielectric having first and second electrodes formed on both end faces thereof, a through conductor connected to the first electrode, and a ground plate connected to the second electrode. In the high voltage through type capacitor, and insulating material selected from the group of self-adhesive silicone rubber and elastic silicone gel is used for insulating at least between the cylindrical dielectric and the through conductor.

20 Claims, 20 Drawing Sheets

HIGH VOLTAGE THROUGH TYPE CAPACITOR AND MANUFACTURING METHOD THEREFOR

BACKGROUND OF THE INVENTION

1. Field of the Invention

The present invention relates to high voltage through type capacitors and manufacturing method thereof and, more particularly, relates to high voltage through type capacitors suitable for noise filters for magnetrons provided in electric cooking ranges.

Description of Related Art

Conventionally, through type capacitors for preventing radio noise from leaking from magnetrons used for electric cooking ranges are well known, for instance in Japanese utility model publications S55-35803/1980 (IPC:H01

Next, the construction of a conventional through type capacitor is explained with reference to FIGS. 33, 34(a) and 34(b).

The through type capacitor has a cylindrical dielectric 1 of through type made of a ceramic on both end faces of which first and second thick film electrodes 2 and 3 are formed by burning Ag paste at a temperature of 700 to 800° C. A conductor 4 is arranged so as to pass through the cylindrical dielectric 1 and is electrically connected to the first electrode 2 by a connection plate 5 via solder. An enlarged ground metal plate 6 is electrically conducted connected to the second electrode 3 by a step portion 6b thereof forming an aperture 6a. The through conductor 4 is covered with an insulating tube 7.

These elements 1, 4, 5 are covered by a cylindrical outer case 9 made of a resin such as polybutylene terephthalate and insulating resin such as epoxy resin is filled into the space defined by the outer case 9 in order to protect those elements 1, 4 and 5. Further, a cylindrical insulating cover 10 covers the lower portion of the conductor 4.

Epoxy resin used as an insulation filler shrinks in a direction indicated by arrows upon curing, as shown in FIGS. 34(a) and 34(b) and, thereby, a small gap is formed at the boundary surface 1a between the cylindrical dielectric 1 and the epoxy resin filled inside of the dielectric 1. More particularly, the linear thermal expansion coefficients of the ceramic forming the cylindrical dielectric 4 and the epoxy resin are $1 \sim 10 \times 10^{-6}/°$C. and $1 \sim 10 \times 10^{-5}/°$C. respectively, and when a thermal shock test for the through type capacitors is performed, gaps and cracks are caused at the boundary 1a between the ceramic and epoxy resin by relatively strong residual thermal stress due to the big difference between the thermal coefficients mentioned above. This invites a concentration of charge and drop of the dielectric strength property. Further, in a humidity resistance test for the through type capacitors, humidity penetrates into the through type capacitors. In order to prevent the humidity from penetrating there into, the insulating tube 7 is provided.

The through type capacitor having the construction mentioned above is exposed to an a higher temperature environment since it is arranged in a shield case of the magnetron. In the electric cooking range, the magnetron is cooled, via cooling fins, by wind generated by a cooling fan and the through capacitor is also cooled by the wind. However, the anode portion of the magnetron is heated up to a high temperature of about 300° C. and the capacitor is always exposed to a high temperature of 100 to 120° C. and often to a higher temperature of about 150° C. Further, accidentally, the capacitor may be heated up to such a high temperature as 180° to 200° C.

Moreover, since goods being operable as both the cooking range and oven are developed and the cooling fans having a low cooling faculty are used for saving cost, the heat resistibility of the through type capacitor is highly demanded.

However, epoxy resin is softened at a temperature of about 150° C. and the degradation thereof progresses rapidly progressed to invites which invites peeling at the boundary surface. Thus, the conventional through type capacitors have a limit to the strict demand of the heat resistance mentioned above.

In order to solve the problem mentioned above, a resin exhibiting a heat resistance of about 200° C. has recently been developed. However, the resin has a very high hardness and, therefore, cracks and breakages are caused due to residual stress generated upon shrinkage thereof and thermal shock and, also, gaps and peeling at the boundary surface are caused. These result in an inferior dielectric strength and poor reliability.

On the contrary, it has been known that silicone rubber has a high heat temperature resistance of about 200° C. together with an elasticity. However, it has no adhesion and, therefore, it is impossible to use the silicone rubber as an insulating filler for the through type capacitor since humidity may penetrate thereinto through small gaps formed between the silicone rubber filled as the insulating filler and the ceramic dielectric 1 resulting in poor insulation.

In order to solve the problem mentioned above, a method for applying a primer to respective elements to be covered by the filler is considered. However, it is impossible to obtain stable dielectric and humidity resistances since an extra step for applying the primer is needed and control of the primer layer is difficult.

Also, the dielectric resistance of an order of ten and several KV is required in the through type capacitor since a high voltage of 7 to 8 KV is applied thereto upon driving the magnetron.

As is apparent from the mentioned above, high dielectric resistance, heat resistance and resistance to thermal shock are required for the through type capacitor.

Further, the through type capacitor is required to have a high tracking resistance as one of the important properties to be owned thereby. This tracking resistance is used to evaluate the dielectric strength in such a case that water is condensed on the surface of the through type capacitor by a rapid and big change in the temperature. In this regard, the insulating case and cover 9 and 10 made of an organic high-polymer conventionally used have poor tracking resistance since the high-polymer is carbonized once a high voltage is leaked along the outer periphery of the capacitor and, thereby, the capacitor comes into a short circuited state.

As mentioned above, since silicone rubber is used as the insulating tube 7 and, therefore, it is high in cost and is laborious because of work for inserting the through conductor thereinto, the cost of the capacitor becomes high. Also, the insulating property of the capacitor using epoxy resin as the insulating filler is worsened rapidly at a temperature higher than 150° C. which is an upper limit of use with respect to the epoxy resin.

SUMMARY OF THE INVENTION

Therefore, one of the objects of the present invention is to provide a through type capacitor wherein self-adhesive silicone rubber is used as an insulating material.

The break down voltage of the high voltage through type capacitor using the self-adhesive silicone rubber is distributed within a range of 26 to 40 KV (AC).

Accordingly, another object of the present invention is to enhance the reliability of the high voltage through type capacitor by concentrating the distribution of break down voltage thereof to the higher voltage side.

A further object of the present invention is to improve the tracking resistance of an outer insulation case and/or insulating cover.

One more object of the present invention is to provide a manufacturing method for manufacturing the through type capacitor which is free from cracks and has a high break down voltage.

In order to achieve these objects, according to the present invention, there is used a silicone gel having an excellent elasticity or self-adhesive silicone rubber as an insulating material to be filled inside of a cylindrical dielectric.

According to one of the aspects of the present invention, a layer of surface lubricant which is hardly adhesive to the self-adhesive silicone rubber is formed beforehand around the middle portion of the through conductor opposed to the inner surface of the cylindrical dielectric. The layer of surface lubricant can be formed by coating Teflon, applying silicone grease or using a silicone tube or Teflon tube (tube made of polytetrafluoroethylene (PTFE), tetrafluoroethylene-perfluoroalkyl vinyl ether copolymer 8 PFA), or tetrafluoroethylene-hexafluoropropylene copolymer (FEP) ). It is also possible to plate the through conductor with a metal which exhibits a weak coupling force with the self-adhesive silicone rubber.

According to another aspect of the present invention, the adhesive silicone rubber filled into the space defined by the outer case or the insulating cover is cured at a low temperature equal to or lower than 80° C. and, thereafter, is heated up to 100° C. or more in order to give an adhesive property thereto. This is called step curing in two stages. This enables the variation of the adhesiveness between the inner surface of the through dielectric and the self-adhesive silicone rubber to be reduced and, therefore, it becomes possible to guarantee high dielectric and tracking resistances.

According to a further aspect of the present invention, creeping discharge is performed on the outer surface of the through type condenser, after filling the self-adhesive silicone rubber thereinto.

According to a still further aspect of the present invention, the contact area between the electrode formed on the end surface of the cylindrical dielectric and the metal plate to be soldered thereto is minimized by line contact in order to avoid a poor voltage resistance which may be caused by a tunnel formed upon soldering therebetween.

According to one more aspect of the present invention, there is provided a mechanically weak portion with respect to the through conductor in order to absorb an external force when exerted thereto.

Silicone gel not having a complete bridge structure exhibits an excellent adhesiveness and a high Young coefficient and is free from shrinkage by curing. Therefore, it can absorb or lighten thermal stresses caused by heat expansion of the cylindrical dielectric and/or the through conductor. This enhances the heat resistance and the resistance to heat shock.

The self-adhesiveness of silicone rubber is obtained by adding one or more components such as a silane coupling agent to silicone rubber composite. The self-adhesive silicone rubber exhibits an excellent adhesiveness to ceramic, metal, plastic and the like and a very high insulation property. Further, it can absorb thermal stresses caused by thermal expansion effectively and, thereby, the heat resistance and the resistance to thermal shock are enhanced similarly to the silicone gel.

As stated above, according to one aspect of the present invention, there is provided a layer of surface lubricant, a tube made of a material which exhibits a poor adhesiveness to the silicone rubber or a plated layer around the middle portion of the through conductor. In this aspect, the through conductor has portions thereof and a portion not adhesive to the same at the middle portion thereof. Accordingly, the silicone rubber filled into adheres to the end portions of the through conductor and hardly adheres to the middle portion thereof. Thus, the sealing property of the silicone rubber to the through conductor is guaranteed effectively.

According to another aspect of the present invention, the outer insulating case and insulating cover can be omitted by forming the outer surface of the through type capacitor with the silicone rubber itself.

The silicone rubber exhibits a so-called water repellency and, therefore, the tracking resistance is enhanced since water condensed on the outer surface of the silicone rubber is dropped off by the water repellency thereof.

Further, since the silicone rubber does not contain a carbon component and, therefore, it does not easily burn, it is free from carbonization even if a creeping leakage is caused along the outer surface of the through type capacitor.

Therefore, it resumes the original insulating state instantly after the creeping discharge if caused.

The curing and adhering reactions of the self-adhesive silicone rubber are caused for one or two hours when it is maintained at a temperature equal to or higher than 100° C.

Among these reactions, a temperature equal to or higher than 100° C. is absolutely needed for adhering reaction but curing reaction can be caused even at room temperature although it needs a long time.

In general, it is convenient in the manufacturing to progress with the above two reactions in parallel by heating the molded silicone rubber up to a high temperature equal to or higher than 100° C.

However, in the present invention, these two reactions are able to be done separately. Namely, curing reaction progress at a low temperature taking a long time and, after completion of the curing, adhering is done. According to this method, the thermal expansion of the through conductor can be suppressed effectively during curing reaction.

According to a further aspect of the present invention, a creeping discharge treatment is made to the outer surface of the hardened insulating resin in order to make it smooth. The smoothed outer surface can prevent dust or water from adhering and, therefore, creeping leakage can be effectively avoided.

According to a still further aspect of the present invention, contact portions of the brim portion of the through conductor and the ground metal plate which are to be contacted to the first and second electrodes of the cylindrical dielectric, respectively, are formed so as to have narrow contacting areas, in other words, so as to have line contacts therebetween.

This structure can prevent gaps at the contact portions from being generating. Therefore, solvent and flux contained in the cream solder are easily melted out and voids or solder tunnels are hardly generated.

According to one more aspect of the present invention, a Faston tab of the through conductor is bent when an external force larger than a predetermined value is exerted. This prevents the cylindrical dielectric from breaking.

BRIEF DESCRIPTION OF THE DRAWINGS

These and other objects and features of the present invention will become clear from the following description taken in conjunction with the preferred embodiment thereof with reference to the accompanying drawings, in which:

FIGS. 13(a) and 13(b) are explanatory views for showing directions of adhesion regarding self-adhesive silicone rubber wherein FIG. 13(a) is an enlarged partial view of FIG. 12 and FIG. 13(b) is an enlarged partial sectional view along Y-Y'line of FIG. 12;

FIGS. 34(a) and 34(b) are explanatory views for showing a manner of curing of epoxy resin wherein FIG. 34(a) is an enlarged partial view of FIG. 33 and FIG. 34(b) is an enlarged sectional view along the line X—X' of FIG. 33.

DETAILED DESCRIPTION OF THE PREFERRED EMBODIMENTS

Figure 33:
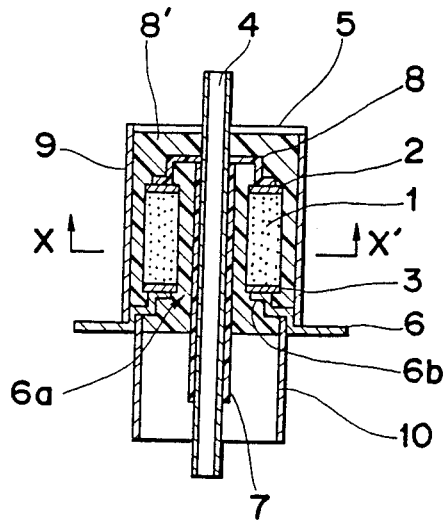
FIG. 33 is a cross-sectional view of a conventional high voltage through type capacitor.
Figure 33:
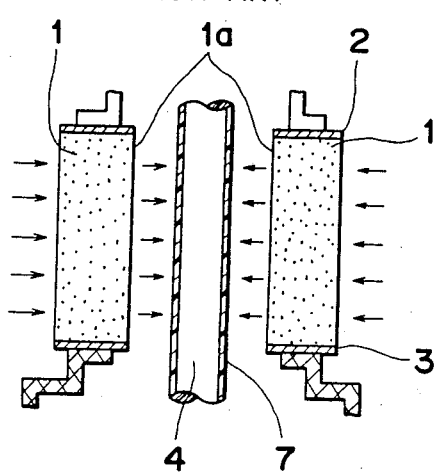
Figure 33:
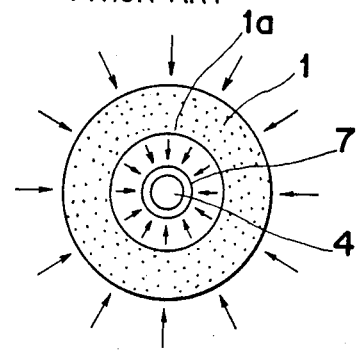

It is to be noted that the same reference numerals as those of elements of the conventional through type capacitor shown in FIGS. 33 and 34 are used hereinafter in order to indicate elements of the through type capacitor according to the present invention as far as they correspond to those of the conventional one.

Figure 1:
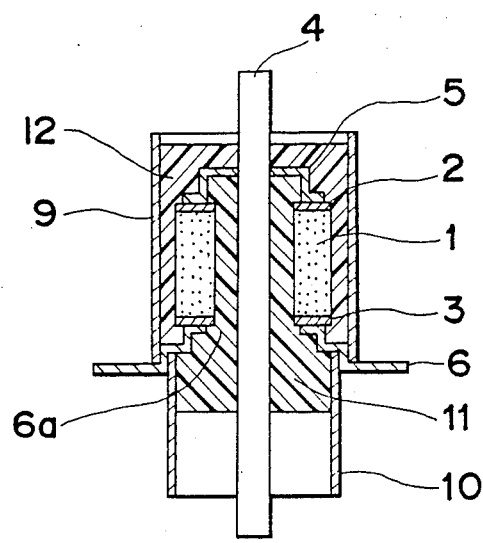
FIGS. 1, 2, 3 and 4 are cross sectional views of high voltage through type capacitors according to the present invention, respectively.

FIG. 1 shows the first preferred embodiment according to the present invention.

In this preferred embodiment, silicone gel 11 is filled into a space inside of the cylindrical dielectric 1.

The silicone gel to be used has a penetration of 60 and an elasticity of 850% according to JIS (Japanese Industrial Standard). Also, the epoxy resin 12 having a Shore hardness of D-90 according to JIS is filled into a space outside of the cylindrical dielectric 1 and cured to have a strength of 15 Kg·f in the axial directions of the through conductor 4.

Other structures of the through type capacitor are substantially same as those of the conventional one.

Figure 2:
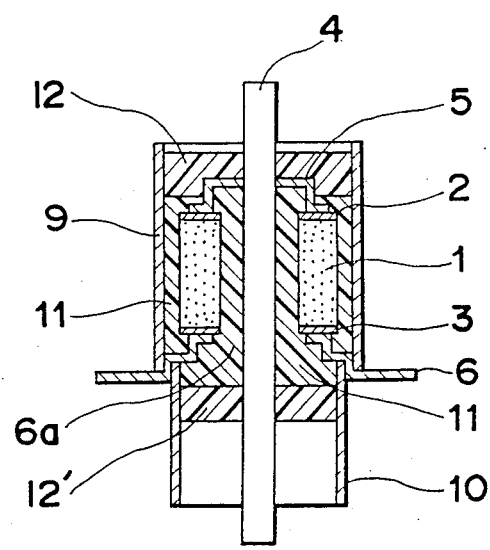

FIG. 2 shows the second preferred embodiment of the present invention.

In this preferred embodiment, silicone gel 11 having a penetration of 60 and an elasticity of 850% according to JIS is filled both spaces inside and outside of the cylindrical dielectric. Both end faces of the filled silicone gel are covered by layers 12 and 12' of epoxy resin having a Shore hardness of D-90 according to JIS.

The humidity resistance of the capacitor is increased by the two layered structure effectively and a mechanical strength of 15 Kg· f is obtained in the axial direction of the through conductor 4.

According to the first and second preferred embodiments, the filled silicone gel absorbs and lightens stresses caused by thermal expansions of the outer case 9 and the cylindrical dielectric 1 during the heat resistance test and/or a heat shock test.

It is also possible to use self-adhesive silicone rubber in place of the silicone gel which has a far higher hardness than that of the latter.

Figure 3:
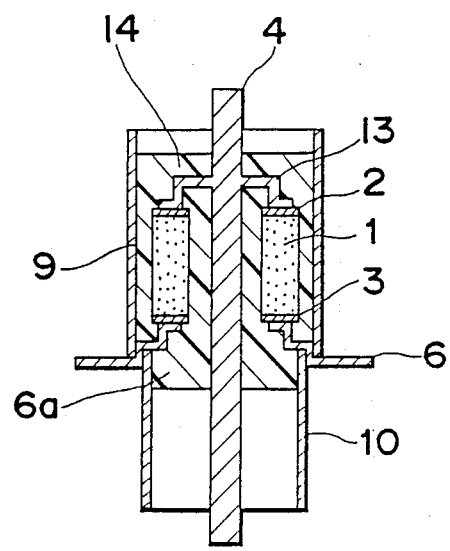

Next, the third preferred embodiment using the self-adhesive silicone rubber is explained referring to FIG. 3.

In this preferred embodiment, the through conductor 4 has a connecting brim 13 formed from a metal rod by header work.

The connecting brim 13 and the enlarged ground metal plate 6 are electrically connected to the first and second electrodes 2 and 3 using an Sn—Ag eutectic crystalline solder. The melting point of this solder is 220° C. which is higher than that of an Sn—Pb eutectic crystalline solder (183° C.). Accordingly, the heat resistance of the through type capacitor is improved. It is also desirable to use a resin having a good heat resistance such as polyphenilene sulphide (PPS), polybuthylene telephthalate (PBT) or the like. The thermally deformable temperature of PBT resin is about 210° C. and that of PPS resin is 260° C. As the self-adhesive silicone rubber to be used for an insulating material, self-adhesive silicone TSE 3331 offered by Toshiba Silicone Corp. is desirably used. TSE is a thermosetting silicone rubber of two types of liquid and is cured by heating. This is made by mixing a main agent (A) and a curing agent (B).

Next, the manufacturing method of the through type capacitor according to the present invention is explained. The method is comprised of the following steps [1] to [8].

[1] Forming cylindrical dielectrics using powder of ceramic such as barium titanate;

[2] Burning them;

[3] Forming electrodes 2 and 3 by burning Ag paste or Ag-Pd paste applied on both end surfaces of the cylindrical dielectric by printing;

[4] Printing cream solder on respective electrodes 2 and 3;

[5] Assembling the cylindrical dielectric 1, the through conductor 4 and the enlarged ground metal plate 6 using suitable tools;

[6] Soldering the electrodes 2 and 3 to the connecting brim 13 and the ground metal plate 6 using a reflow furnace;

[7] Washing elements assembled using furonic acid or trichloroethane; and

[8] Filling the insulating resin 14 into spaces of the assembled elements.

Properties of the through type condenser of FIG. 3 manufactured according to the method mentioned above are explained hereafter.

Figure 5:
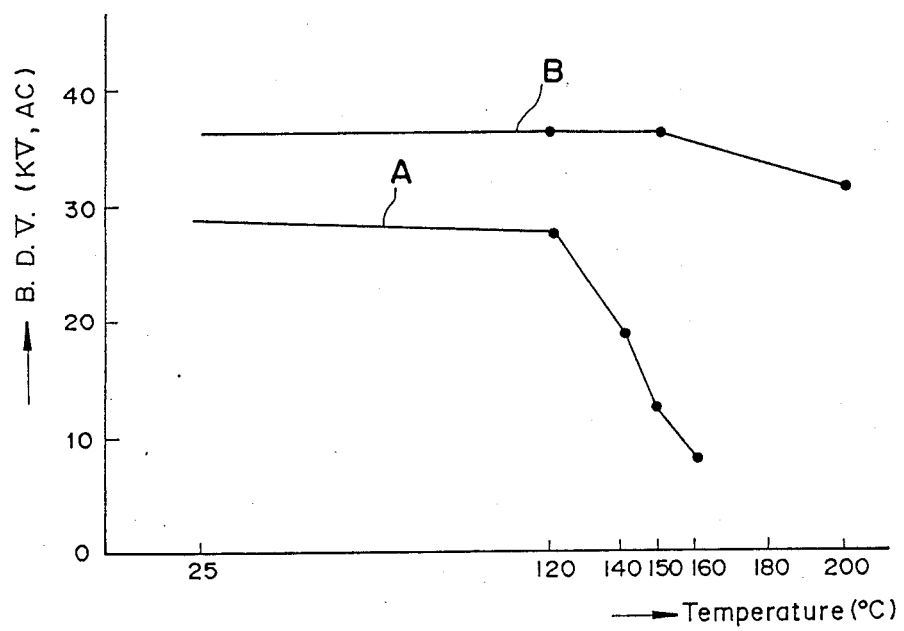
FIGS. 5, 6, 7 and, 8 are graphs for comparing respective properties of the high voltage through type capacitor according to the present invention with the conventional through type capacitor.

FIG. 5 is a graph showing a property of B.D.V. (Break Down Voltage) in relation to the temperature of the through type capacitor. Lines A and B indicate those of the conventional through type capacitor shown in FIG. 33 and the through type capacitor according to the present invention.

The measurement of B.D.V. is done in such a manner as follows.

Several samples are extracted from the same lot arbitrarily and dipped in silicone oil which is a high insulating material. The silicone oil is heated up to a high temperature of, for example, 120° C. and is maintained at that temperature for 10 to 15 minutes. Under these conditions, a high A.C. voltage is applied between the enlarged ground metal plate 6 and the through conductor 4 of each sample The average B.D.V. of several samples at 120° C. is 26.5 KV (A.C) regarding the conventional through type capacitor Other data is also measured similarly.

As is apparant from FIG. 5, B.D.V. of the conventional through type capacitor steeply decreases to about 10 KV as the temperature increases up to 150° C. Since B.D.V. is demanded to have a value equal to or larger than 10 KV (A.C) in a normal sense, 150° C. is an upper limit of use with respect to the conventional through type capacitor.

Contrary to the above, B.D.V. of the through type capacitor according to the present invention is about 30 KV (A.C) even at 200° C. Thus, according to the present invention, a B.D.V. much higher than that of the conventional through type capacitor is obtained.

Figure 6:
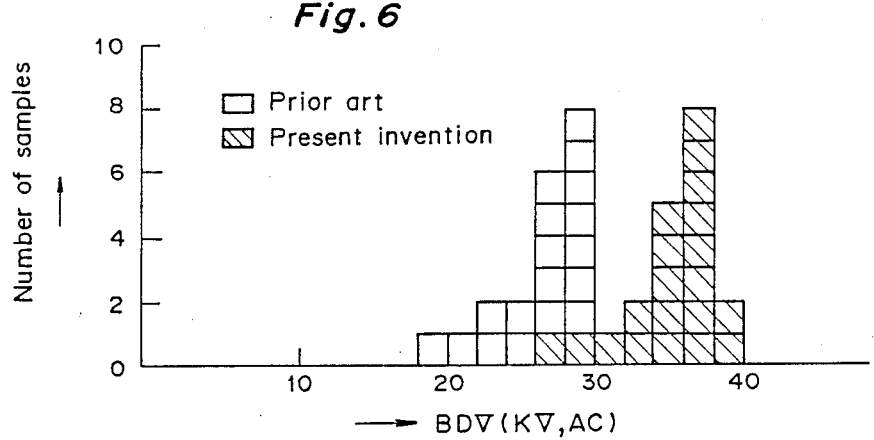

FIG. 6 is a histogram for showing a distribution of numbers of samples about each of which a breakdown is first caused. The measurement is done with respect of twenty samples at a room temperature (20° C.). Blank blocks indicate samples of the conventional through type capacitor and hatched blocks indicate those of the through type capacitor according to the present invention.

As is apparent from the data shown in FIG. 6, the dielectric strength of the through type capacitor is greatly improved in comparison with that of the conventional one.

Figure 7:
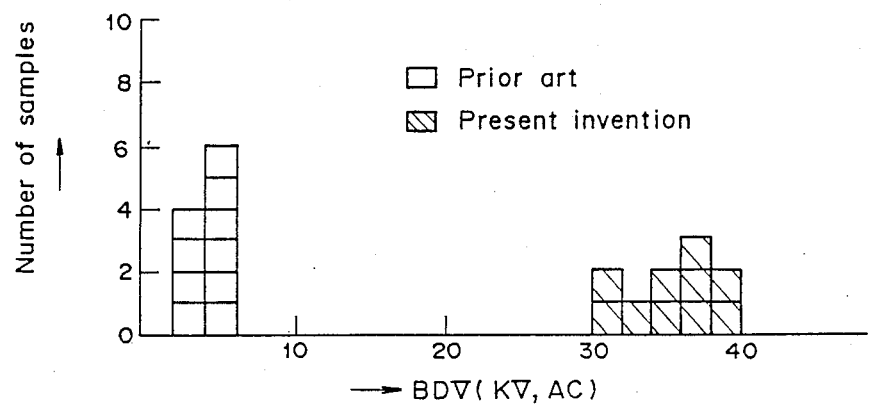

FIG. 7 is a histogram for showing B.D.V. distribution with respect to samples having been kept for 1,000 hours in a thermoregulator at 150° C.

As is apparent from FIG. 7, all samples of the conventional through type capacitor are broken down dielectrically at a voltage lower than 10 KV. In contrast with this, samples of the present through type capacitor exhibit an excellent B.D.V. property similarly to the initial B.D.V. shown in FIG. 6.

Figure 8:
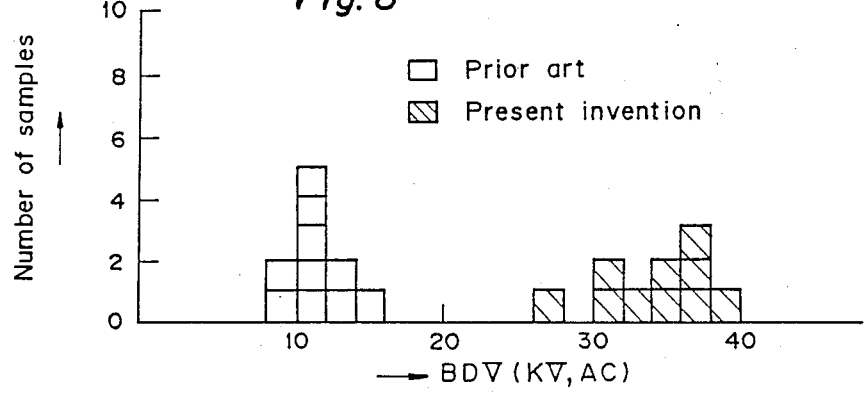

FIG. 8 is a histogram for showing B.D.V. distribution obtained at room temperature after the thermal shock test wherein samples are put in a thermoregulator at (−40° C.) for 30 minutes and( then, replaced in a thermoregulator at 150° C. for 30 minutes is repeated 200 cycles.

As is apparent from FIG. 8, samples according to the present invention exhibit a B.D.V. property similar to the initial B.D.V. property as shown in FIG. 6 although the dielectric break down voltage is extremely lowered in the conventional through type capacitor.

Figure 4:
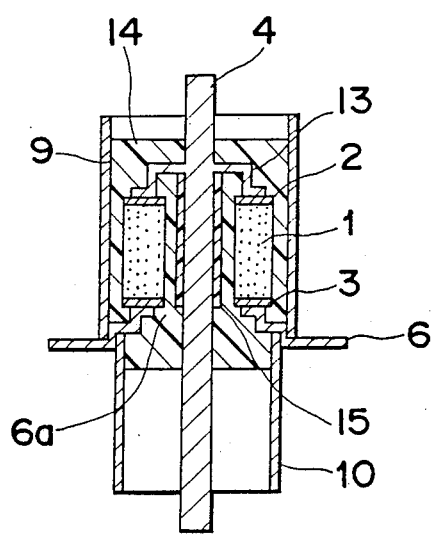

FIG. 4 shows the third preferred embodiment of the present invention.

In this preferred embodiment, a surface lubricant layer 15 which is hardly adhesive to the self-adhesive silicone rubber is formed around a portion of the through conductor 4 which is enclosed by the cylindrical dielectric 1. The surface lubricant layer 15 can be formed by Teflon coating, silicone grease a silicone tube or a Teflon tube [for example, a tube made of polytetrafluoroethylene (PTFE), tetrafluoroethylene-perfluoro alkyl vinyl ether copolymer or tetrafluoroethylene-hexafluoro propylene copolymer (FEP) ]. It is desirable to elongate the axial length of the surface lubricant layer 15 longer than the axial length of the cylindrical dielectric 1, as shown in FIG. 4.

Self-adhesive silicone rubber 14 (for example, TSE 3331) is filled into spaces of the through type capacitor as an insulating material.

In this structure, the middle portion of the through conductor 1 enclosed by the cylindrical dielectric 1 is not adhesive to the filled self-adhesive silicone rubber 14 but the cylindrical dielectric 1 is well adhesive thereto. Accordingly, any peeling off between the cylindrical dielectric 1 and the filled silicone rubber 14 is not caused even by residual stresses caused by thermal shocks given in the thermal shock test. Further, portions of the through conductor 4 other than the middle portion thereof covered by the surface lubricant layer 15 (tube) is well adhesive to the filled silicone rubber 14 and, therefore, the humidity, temperature and voltage resistances of the through type capacitor are improved effectively.

It is to be noted that the surface lubricant layer (tube) 15 is formed to have a thickness (for example 0.1 mm) far thinner than that (about 0.5 mm) of the silicone tube conventionally used in the through type capacitor and is not required to have a good elasticity.

It is also possible to form a metal layer in place of the surface lubricant tube 15 by plating a metal such as nickel around the middle portion of the through conductor, which is hardly adhesive to the self-adhesive silicone rubber.

Figure 9:
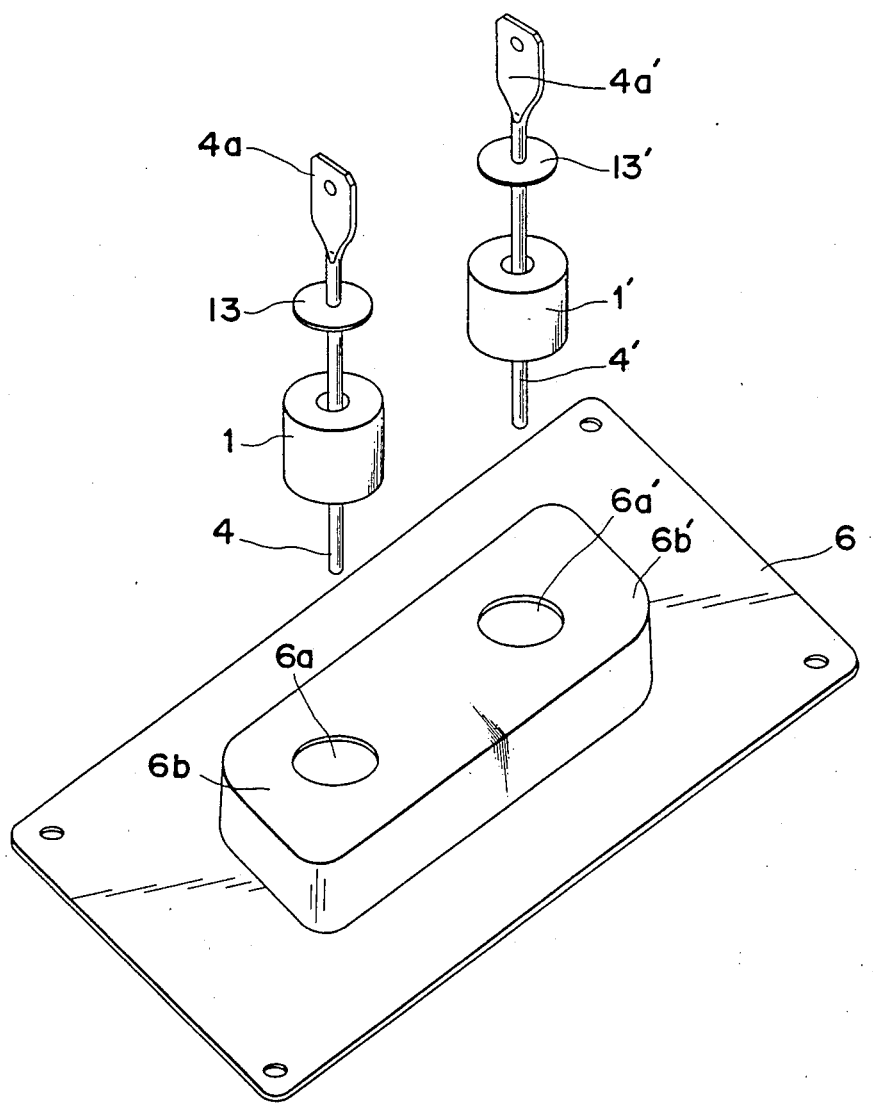
FIG. 9 is an exploded view of the through type capacitor according to the present invention.

FIG. 9 shows an actual high voltage through type capacitor to be used for an electric power supplying line such as a magnetron circuit. The actual through type capacitor of this type provides a pair of through type capacitors which comprise cylindrical dielectrics 1 and 1', through conductors 4 and 4' having connecting brims 13 and 13' integrally, an enlarged ground metal plate 6, an outer case (not shown) and an insulating cover (not shown). Self-adhesive silicone rubber is filled into spaces formed therein. Upper ends of the through conductors 4 and 4' are formed as Faston tabs 4a and 4a' to be inserted into a female terminal socket (Faston receptacle) of the electric cooking range.

Figure 10:
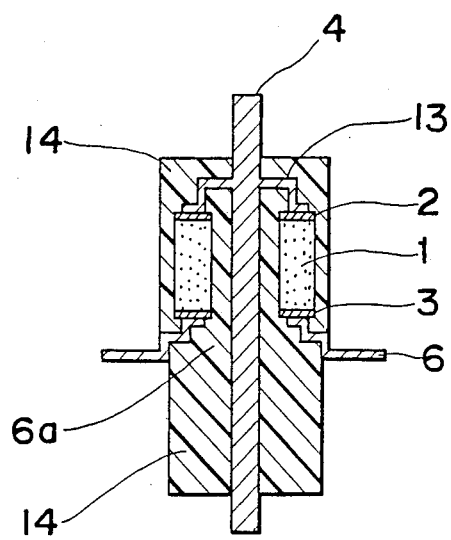
FIGS. 10, 11 and 12 are cross sectional views of high voltage through type capacitors according to another preferred embodiment of the present invention.

FIG. 10 shows fourth preferred embodiment of the present invention.

In this embodiment, the outer insulating case 9 and insulating cover 10 are omitted and the self-adhesive silicone rubber itself forms outer faces of the capacitor.

Upon manufacturing the capacitor of this type, a pair of molding dies made of Teflon are used for filling the self-adhesive silicone rubber In this case, a step [9] for removing molding dies after curing the filled silicone rubber is to be added after the step [8] of the manufacturing method mentioned above. Since Teflon is not adhesive to the silicone rubber, the dies are easily removed.

This type of the through type capacitor exhibits substantially same B.D.V. properties as shown in FIGS. 6 to With respect to the tracking resistance, the following test was done.

Samples of the through type capacitor are hunged down from a ceiling plate of a box and are sprayed with water from an ultra-sonic humidifer. In this state, a high voltage of 5 KV (A.C) is applied between the through conductor 4 and the ground metal plate 6 and a time period from the beginning of discharge till a current therebetween is increased up to 10 mA chosen as a cut-off current is measured. When it is increased up to the cut-off current, the application of voltage is cut off. Then, after wiping the surface of the capacitor using a dry cloth, the second test is performed. The third and fourth tests are also done similarly.

Table 1 shows results of the test with respect to three samples chosen arbitrarily.

TABLE 1

| | No. | 1st | 2nd | 3rd | 4th |
|---|---|---|---|---|---|
| | | Number of times of discharge | | | |
| Prior | 1 | 27 min. | broken down | | |
| Art | 2 | 16 min. | instantly 27 min. | broken down instantly | |
| | 3 | 13 min. | broken down instantly | | |
| Present Invention | 1 | 46 min. | 30 min. | 42 min. | more than 200 min. |
| | 2 | 38 min. | 14 min. | 53 min. | more than 200 min. |
| | 3 | 25 min. | 43 min. | 29 min. | more than 200 min. |

In this test, no discharge is detected for 200 minutes in the fourth test of the samples according to the present invention and the measurement is suspended when 200 minutes has been passed.

As is apparent from FIG. 1, the conventional capacitors are easily broken down since surfaces of the outer case 9 and the insulating case 10 are carbonized to form conductive passages (short circuit) once a creeping discharge has been generated. Contrary to the above, the capacitors according to the present invention can resume to the initial state thereof at every occurence of the creeping discharge and, therefore, the tracking resistibility thereof is greatly increased.

Figure 11:
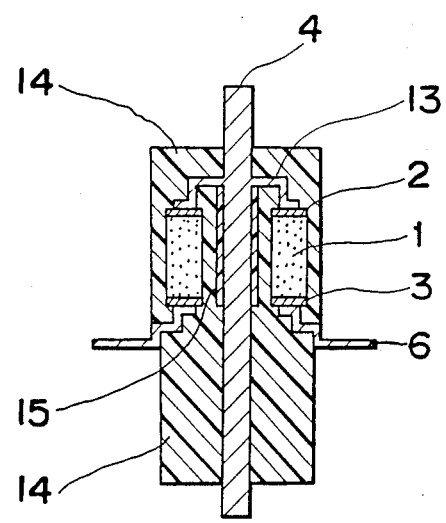

In the example shown in FIG. 11, a surface lubricant layer 15 is formed around the portion enclosed by the cylindrical dielectric 1 similarly to the case shown in FIG. 4.

Figure 12:
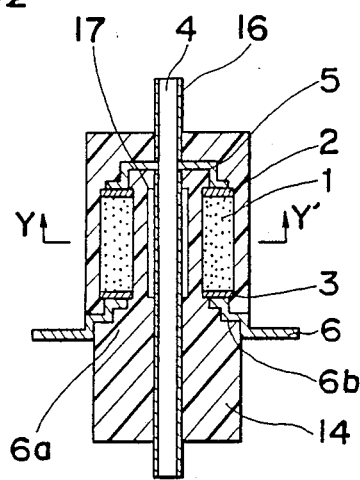

In the example shown in FIG. 12, a plated layer 16 being not adhesive to the self-adhesive silicone rubber is formed along the whole length of the axial portion of the through conductor 4 in order to form a none-adhesive range along the middle portion to the through conductor 4.

Next, the method for forming the none-adhesive range will be explained with reference to FIGS. 12 and 13.

Elements of the through type capacitor are assembled similarly to those of the through type capacitor shown in FIG. 10 and self-adhesive silicone rubber is filled into spaces thereof.

Figure 13A:
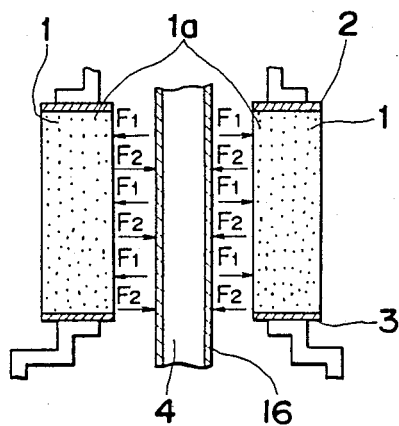
Figure 13B:
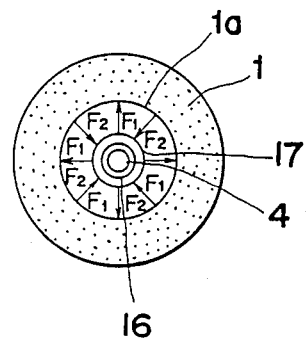

Upon curing the filled self-adhesive silicone rubber, in the portion of the self-adhesive silicone rubber filled inside of the cylindrical dielectric 1, an adhesive force $F_1$ adhering to the inner wall 1a of the dielectric 1 and adhesive force adhering to the through conductor 4 are caused reciprocally as indicated by arrows in FIG. 13. Since the adhesive strength under shear between the inner wall (1a) of the cylindrical dielectric 1 and the self-adhesive silicone rubber is about 15 Kg/cm$^2$ and that between the through conductor 4 and the self-adhesive silicone rubber is about 7 Kg/cm$^2$, the adhesive force $F_1$ becomes stronger than the adhesive force $F_2$. Accordingly, the resultant force being equal to $(F_1-F_2)$ is exerted in the silicone rubber so as to form a gap (none-adhesive range) between the through conductor 4 and the silicone rubber.

Since other portions of the through conductor 4 are not enclosed by the cylindrical dielectric 1, only the force $F_2$ acts so as to adhere the self-adhesive silicone rubber to those portions of the through conductor 4. According, the non-adhesive range 17 is formed in the middle portion of the through conductor 4 and, in the other portions thereof, the self-adhesive force adheres thereto strongly. Thus, the thermal expansion of the through conductor 4 due to a big change in the temperature effectively suppressed and thermal stresses to be caused in the silicone rubber due to the big change in the temperature can be minimized and, thereby, the deterioration of the self-adhesive silicone rubber 14 is effectively avoided.

Next, the method for hardening the self-adhesive silicone rubber is hereafter explained with reference of FIG. 10.

[Example 1]

As self-adhesive silicone rubber 14, silicone rubber offered by Toshiba silicone Corp. is desirably used. As stated above, TSE 3331 is a thermoplastic silicone rubber of two types of liquid which is made by mixing a main agent A and a curing agent B.

In this example, the through type capacitor having a bare silicone rubber as shown in FIG. 10 is used.

Before entering the detailed explanation of the present example, B.D.V. property of the high voltage through type capacitor manufactured using the conventional method according to which the self-adhesive silicone rubber is exposed at a temperature higher than 100° C. to progress the curing reaction and the adhering reaction simultaneously is explained at first.

According to an analysis of the through type capacitors according to the conventional method which have been subjected to the break down test, the breakdown generated at a relatively low voltage of 26 to 32 KV (A.C) is caused by a discharged on the boundary plane between the inner surface of the cylindrical dielectric and the silicone rubber and, in the capacitor broken down at a relatively high voltage of 34 to 40 KV (A.C), the cylindrical dielectric is broken into pieces. The cause why such breakdown modes of two kinds arise may be instability of the adhesion between the inner wall of the cylindrical dielectric and the silicone rubber.

Figure 14A:
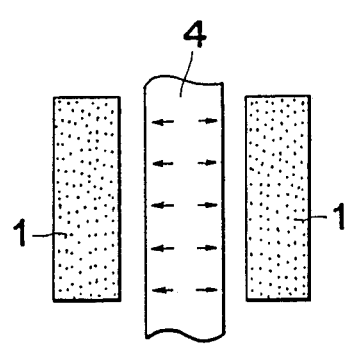
FIGS. 14 and 15 are explanatory views for showing internal actions caused according to conventional and present manufacturing methods, respectively.

According to the conventional method in which the curing reaction and adhering reaction are progressed simultaneously at a high temperature ($\geq 100°$ C. ), the self-adhesive silicone rubber is cured and at the same time, adheres to the through conductor having been expanded at the high temperature. In this state, the diameter of the conductor is increased by the thermal expansion, as indicated by arrows in FIG. 14(a).

Figure 14B:
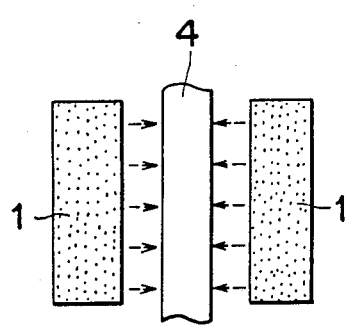

However, it is decreased when the capacitor is put at a room temperature and, therefore, residual stresses directed inwardly are generated in the silicone rubber by shrinkage of the conductor, as indicated by arrows in FIG. 14(b). This may be the cause of the instability of the adhesion mentioned above.

Figure 15A:
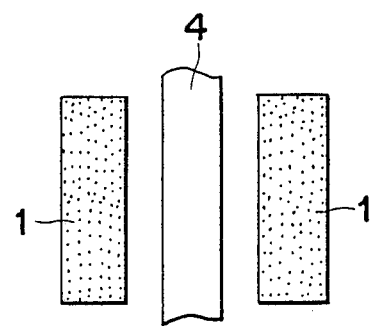
Figure 15B:
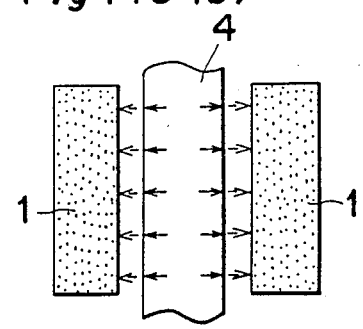
Figure 15C:
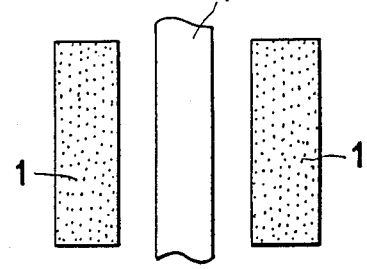

FIG. 15 shows schematical steps (a), (b) and (c) according to the two stage curing method of the present invention.

The step (a) of FIG. 15 shows a curing step of the self-adhesive silicone rubber to be progressed at a low temperature. In this step, the thermal expansion of the conductor is suppressed low.

The step (b) of FIG. 15 shows the adhering step of the self-adhesive silicone rubber. In this step, only the adhering reaction thereof is progressed at a high temperature and the silicone rubber receives a compression force, as indicated by thin arrows, which is generated by the thermal expansion of the through conductor indicated by thick arrows. However, the silicone rubber does not receive any stresses, by the through conductor when the latter is shrunk at a room temperature, as shown in the step (c) of As is apparent from the above mentioned, according to the manufacturing method of the present invention, the silicone rubber never receives a force which forces it to peel off the through conductor though it receives a compression force from the through conductor. On the contrary, according to the conventional curing method, the silicone rubber is pulled by the through conductor and thereby, is enforced to peel off the adhesion between the through conductor and the silicone rubber. Also it is to be noted that the strength of the silicone rubber against the tensile force is higher than the strength thereof against the compressive force.

Further, it is desirable to use a metal having a small heat expansion coefficient as the through conductor in order to avoid affections due to the thermal expansion. Namely, amber (36 Ni-Fe), 42 alloy (42 Ni-Fe) and Fe having heat expansion coefficients of $2.0 \times 10^{-6}$, $6.5 \sim 7.0 \times 10^{-6}$ and $11.5 \times 10^{-6}$, respectively, are desirably usable.

Next, another method for manufacturing the through type capacitors as shown in FIG. 10.

This method includes sixteen steps from [1] to [16] among which steps from [1] to [7] are substantially the same as those explained with respect to the second preferred embodiment and therefore, it is characterized steps from [8] to [16]

Namely, this method is comprised of the following sixteen steps.

[1] Forming cylindrical dielectrics using powder of ceramic such as barium titanate;

[2] Burning them;

[3] Forming electrodes 2 and 3 by burning Ag paste or Ag-Pd paste applied on both and surfaces of the cylindrical dielectric by printing;

[4] Printing cream solder on respective electrodes 2 and 3;

[5] Assembling the cylindrical dielectric 1, the through conductor 4 and the enlarged ground metal plate 6 using suitable tools;

[6] Soldering the electrodes 2 and 3 to the, connecting brim 13 and the ground metal plate 6 using a reflow furnace;

[7] Washing elements assembled using furonic acid or trichloroethane;

[8] Weighing self-adhesive silicone rubber of two types of liquid and mixing two liquids thereof;

[9] Releasing pores in the silicone rubber under a vacuum equal to lower than 10 mmHg;

[10] Filling the silicone rubber into dies made of

11] Releasing pores in the filled silicone rubber under the vacuum;

12] Curing reaction at 50° C. for 48 hours;

13] Adhering reaction at 120° C. for 1 to 2 hours;

14] Reversing dies in order to fill the silicone another side with respect to the ground metal plate 6;

[15] Repeating steps from 8 to 14 in order to manufacture many capacitors; and

[16] Removing dies made of Teflon.

As mentioned above, dies are easily removed since Teflon is hardly adhesive to the silicone rubber.

Insulating cases and covers can be used for covering the bare silicone rubber molded since they give no affection to the through conductor and the silicone rubber.

[Example 2]

TSE 3331 used in the Example 1 is usually used for performing the curing reaction and the adhering reaction simultaneously and the rate of the curing reaction at a low temperature is too low to obtain a high workability. This is because a large reaction decelerator is contained in the silicone rubber in order to give a long pot life of about 8 hours (which is defined as a time until the viscosity becomes twice of the initial viscosity).

Accordingly, in Example 2, another self-adhesive silicone rubber is used in place of TSE 3331.

Namely, a self-adhesive silicone rubber containing a small amount of the reaction decelerator is used in order to accelerate the curing reaction at a low temperature. For example, XE14-804 offered by Toshiba silicone Corp. is desirably usable. Since the silicone rubber is cured for two hours at 50° C. and the adhering reaction is completed for one hour at 120° C., the work time can be shortened. However, the pot life (about one hour) thereof becomes far shorter than that of TSE 3331.

Figure 16:
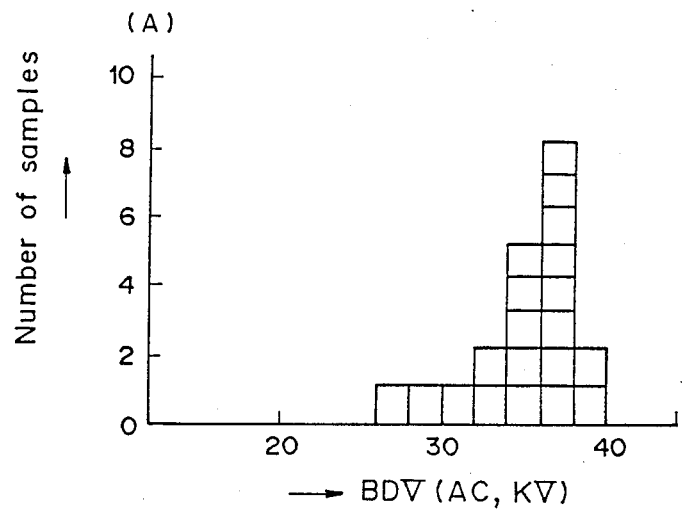
FIGS. 16 and 17 are histograms showing distributions of the break down voltage regarding the conventional through type capacitor and the through type capacitor according to the present invention, respectively.
Figure 17:
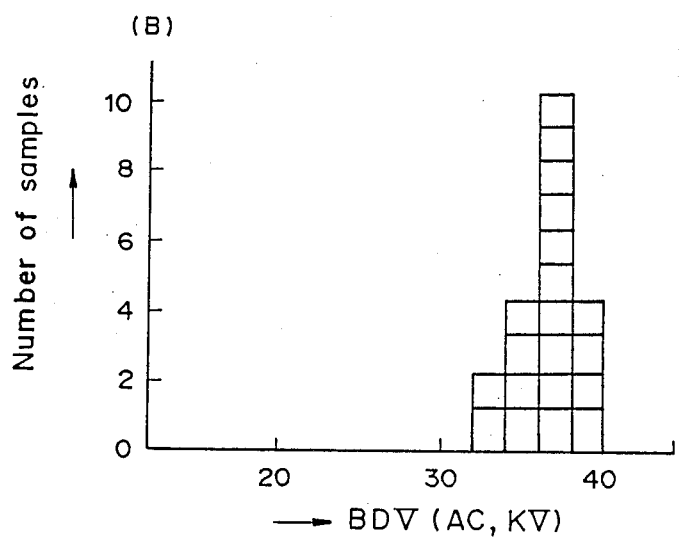

FIGS. 16 and 17 are respective histograms showing distributions of the capacitor manufactured according to the conventional method and that manufactured according to the present method mentioned just above.

The histogram shown is FIG. 16 corresponding to the conventional capacitor indicate that the initial B.D.V. is widely distributed from a lower voltage to a higher one. On the contrary, the histogram corresponding to the present invention, the initial B.D.V. is concentrated to a narrow range of high voltage.

In this test, respective twenty samples are extracted from the same lot and the initial B.D.V. is measured at a room temperature (20° C.).

According to a further preferred embodiment of the present invention, the high voltage through type capacitor as shown in FIG. 10 is subjected to a creeping discharge treatment.

Hereafter, the creeping discharging method is explained in detail.

At first, the high voltage through type capacitors of the type of FIG. 10 are arranged in a closed box in a state of high humidity. The high humidity state is realized by spraying water using an ultra-sonic humidifier arranged in the box.

Then, A.C voltage of 5KV is applied to each of the capacitors arranged in the box.

This state is kept until a first creeping discharge occurs. The cut off current for cutting off the A.C voltage is set at 10 mA. Then, the creeping discharging treatment is repeated.

Table 2 shows respective numbers of times of discharges and time intervals until discharges occur with respect three samples A, B and C.

TABLE 2

|   | 1st | 2nd | 3rd | 4th |
|---|-----|-----|-----|-----|
| A | 46 min. | 30 min. | 42 min. | no discharge |
| B | 38 min. | 14 min. | 53 min. | no discharge |
| C | 25 min. | 43 min. | 29 min. | no discharge |

In this table, the term "no discharge" means that no discharge is observed for 200 minutes and therefore, the measurement is suspended thereafter.

As is apparent from Table 2, the third discharge occurs within one hour from the second discharge with respect to all samples but no discharge is observed after the third discharge with respect to all samples.

This may be based on the following reasons. (A) An insulting layer of $SiO_2$ is formed on the surface of the self-adhesive silicone rubber by performing the creeping discharge treatment to the silicone rubber having a relatively rough surface.

(B) In general, the insulating layer is hardly electrified and therefore, dust hardly adhere to the insulating layer although dust is are apt to adhere to the surface of the bare silicone rubber since the silicone rubber is easily electrified.

(C) The rough surface of the silicone rubber is smoothed by the creeping discharge and therefore, dust and water mist are hardly adhesive to the smoothed surface thereof.

These facts can serve to suppress the occurence of the creeping discharge cooperatively.

Next, problems caused upon soldering the connecting plate 5 and the ground plate 6 with the first and second electrodes 2 and 3 formed on the cylindrical dielectric 1 are explained.

Figure 18:
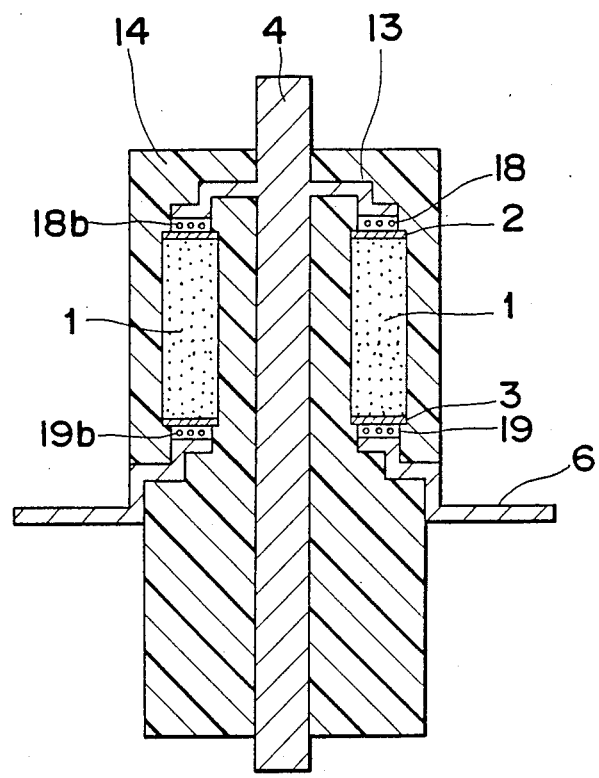
FIGS. 18, 19 and 20 are explanatory views for showing disadvantages which are caused if a brim portion of the through conductor and the ground metal plate are contacted to the first and second electrodes with relatively wide contact areas.

As shown in FIG. 18, electrodes 2 and 3 are formed on the both end surfaces of the cylindrical dielectric 1 of ceramic by burning Ag or Ag-Pd paste and are soldered to the contacting portions 18 and 19 of the connecting and earth metal plates 13 and 6 with cream solders 18a and 19a. The cream solder is made paste-like for printing. The solvent and solder flux are usually melted out completely upon melting the solder or volatilized away. However, they may remain in the melted solder depending on an amount of application, a temperature, a heating time and the like and thereby, porous voids 18b and 19b are apt to be formed. This phenomenon may be formed due to plane contacts between the first electrode 2 and the contact portion 18 of the connecting plate 13 and between the second electrode 3 and the contact portion 19 of the plate 6.

If many voids are formed at respective contact portions 18 and 19, the connection strength is lowered thereat. Further, the flux is apt to remain in the solder even if it is washed and the remaining flux gives bad affections to the adhering reaction of the silicone rubber to be used as an insulating resin. This is because the solder flux hinders the silicone rubber of two types of liquid from curing.

Figure 19:
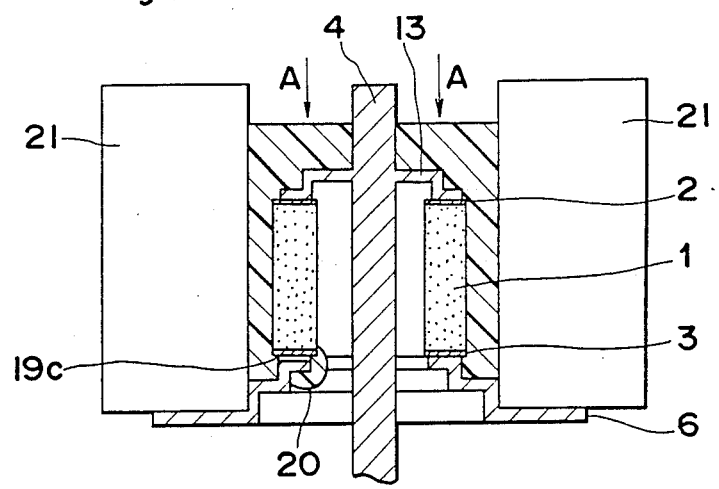

Further, if the contact portions 18 and 19 do not have good plane accuracy, gaps (solder tunnel) are apt to occur. If such a solder tunnel is formed, a leakage 20 of resin is caused therethrough as shown in FIG. 19.

This worsens the dielectric resistance of the capacitor due to the following reason. Namely, when the silicone rubber is filled into the upper space defined by the die 21 of Teflon wherein the assembly of the elements is set, as indicated by arrows A of FIG. 19, the filled silicone rubber leaks to the inner space of the assembly through the solder tunnel. The leaked silicone rubber 20 is cured together with the silicone rubber filled in the upper space.

Figure 20:
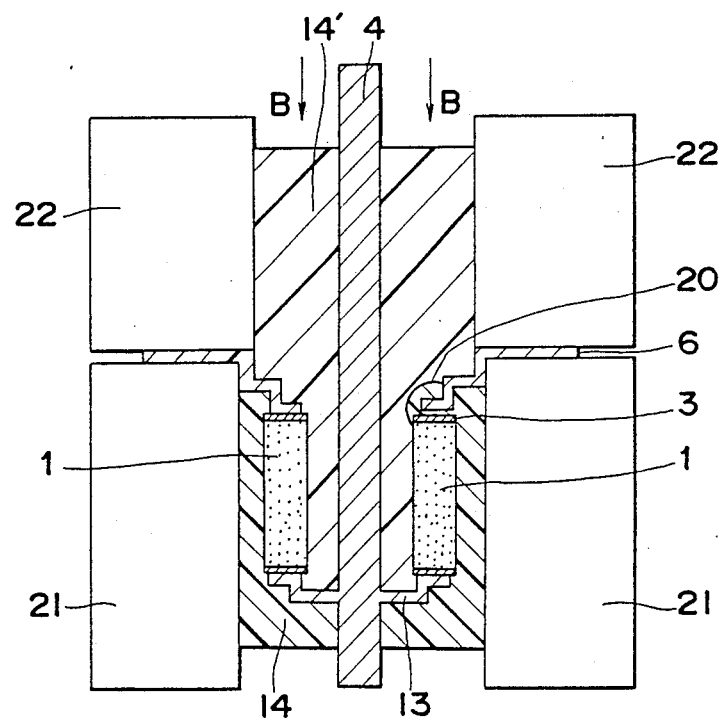

Then, the die 21 is reversed and another die 22 is set on the die 21. Thereafter, the silicone rubber 14' is filled into the die 22 as indicated by arrows B of FIG. 20. The silicone rubber 14' filled later is not adhesive to the leaked silicone rubber 20 and the state of adhesion thereof is also worsened near the leaked silicone rubber 20. Such a poor adhesion causes a poor dielectric strength.

Figure 21:
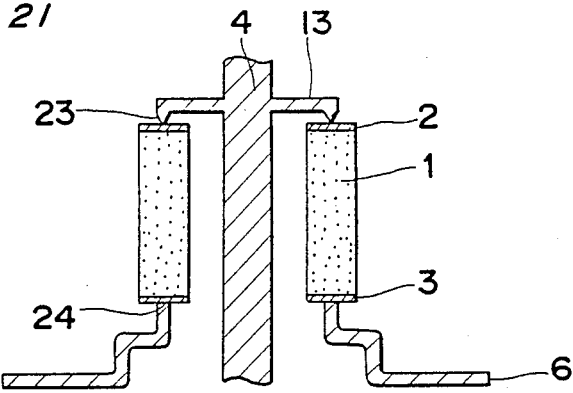
FIGS. 21, 22 and 23 are sectional views of main portions of the through type capacitors according to the preferred embodiment of the present invention wherein the brim portion of the through conductor and the earth ground metal plate are linearly contacted to the first and second electrodes of the cylindrical dielectric, respectively.
Figure 22:
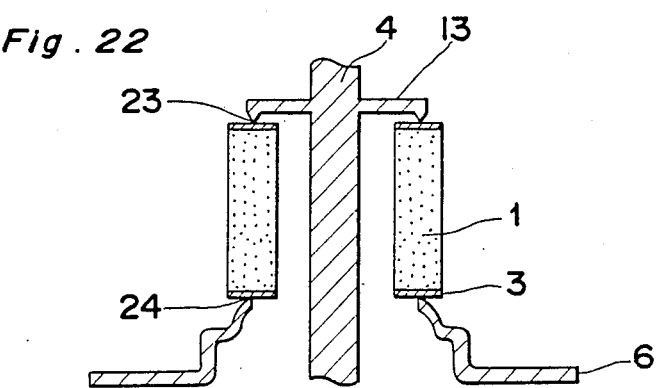
Figure 23:
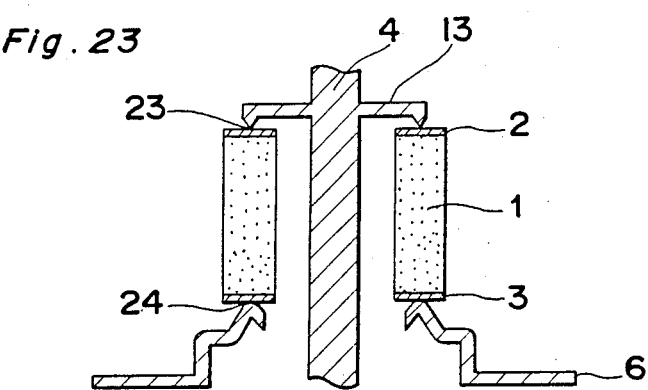

FIG. 21 to 23 show the fifth preferred embodiment of the present invention for solving the problems mentioned above.

In this preferred embodiment, a contact portion 23 of the brim like connecting plate 13 of the through conductor 4 and a contact portion of the ground plate 6 are formed so as to contact linearly to the first and second electrodes 2 and 3 of the cylindrical dielectric 1.

In FIG. 21, the contact portion 23 is sharpened and the contact portion 24 of the ground plate 6 is raised up so as to contact to the electrode only with the thickness of the ground plate.

In FIG. 22, the contact portion 24 of the ground plate 6 is raised up by an angle of 45° and is cut so as to contact to the electrode 3 with an upper edge.

Figure 24:
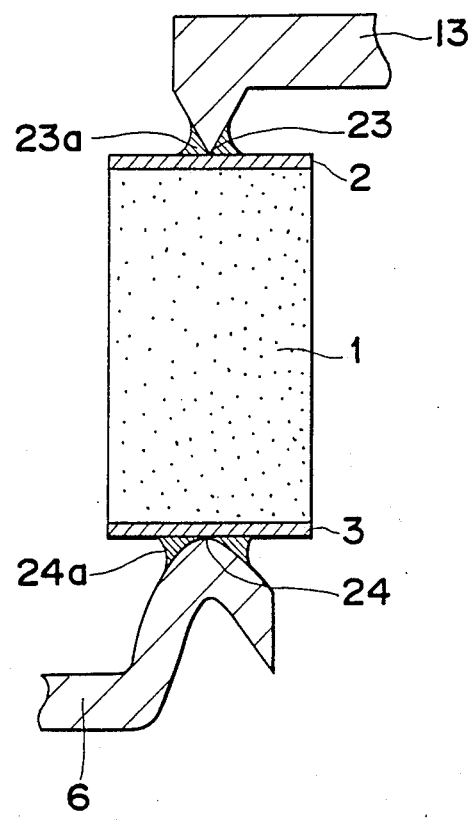
FIG. 24 is an enlarged partial view of FIG. 23.

In FIG. 23, the inside portion of the ground plate 6 is raised up by an angle of 45° and the inner periphery thereof is folded downwardly so as to make a right angle, in order to prevent burrs generated upon pressing from affecting to the contact portion. FIG. 24 shows a state of soldering with respect to the contact portions 23 and 24 in the case shown in FIG. 23.

In these examples shown in FIGS. 21 to 23, respectively, no voids are caused upon soldering since the solvent and the flux contained in the cream solder are completely melted out therefrom by volatilizing. This is because that the contact portions 23 and 24 are linearly contacted to the electrodes, respectively.

Further, in this structure, gaps are difficult to form at the contact portions when compared with the conventional case and therefore, solder tunnels are hardly formed. Thus, leakage of the silicone rubber is effectively prevented and the dielectric strength and the strength of adhesion at the contact portions are much improved.

Next, the sixth preferred embodiment of the present invention is explained. This is intended to prevent cracks from generating in the cylindrical dielectric 1 when an external force is exerted to the through conductor 4.

Figure 25:
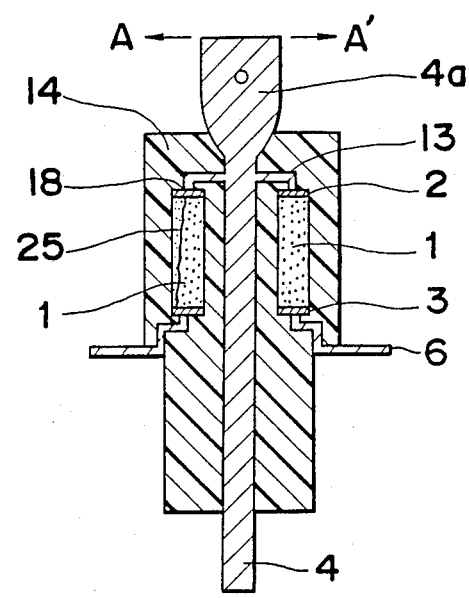
FIG. 25 is an explanatory view for showing cracks caused when an external force is exerted to a Faston tab of the through conductor.

As shown in FIG. 25, when an external force larger than a predetermined value (for example 4 Kg or more) is exerted to the Faston tab, 4a or 4a' in a direction indicated by an arrow A or A' or in a direction perpendicular to A or A', there may be caused a crack 25 in the cylindrical dielectric 1 since the external force is applied via the connecting plate 13 of the through conductor 4, to the dielectric. Once the crack 25 is generated, the dielectric strength drops down extremely.

The external force is applied to the Faston tab 4a or 4a' upon mounting the high voltage through type capacitor onto the magnetron of the electric cooking range, testing the magnetron to the electric cooking range. Such a crack as mentioned above is hardly formed as far as it is normally used. However, it may be caused when the capacitor is forcibly mounted to or dismounted from the range, the Faston tabs 4a and 4a' once inserted are forcibly pulled out or the range is dropped from a high position to exert an extraordinary force on them. It is impossible to find out the crack in the appearance of the capacitor since elements of the capacitor are enclosed by the silicone rubber. The poor dielectric strength is checked only by the final check of the capacitor.

Figure 26A:
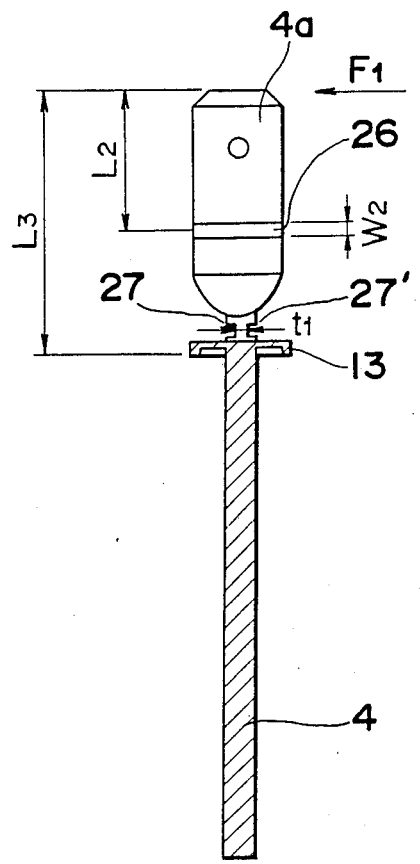
FIGS. 26(a) and 26(b) are respective front and side views of the through conductor according to one of the preferred embodiments of the present invention.
Figure 26B:
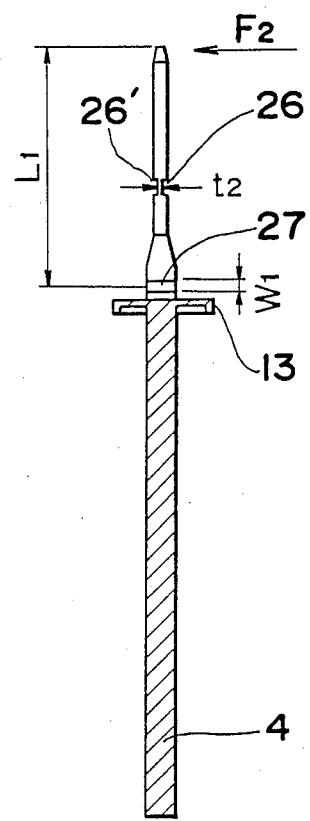

FIG. 26 shows the seventh preferred embodiment of the present invention for preventing cracks from occurring.

The through conductor 4 is formed from an iron rod by header-press work so as to have a brim portion 13 as a connection plate and a Faston tab 4a. On both sides of this Faston tub 4a, two grooves 26 and 26' are formed in parallel in the direction of width thereof. Further, on the joint portion between the Faston tab 4a and the brim portion 13, two grooves 27 and 27' are formed in parallel in the direction perpendicular to the main plane of the Faston tab 4a. The Faston tab 4a is desirably plated using Ni, Sn or the like.

Table 3 shows a relation between the thickness $t_1$ defined between two grooves 27 and 27' and a force $F_1$ exerted to the tip of the tub 4a by which the faston tub 4a is begun to bend. Dimensions indicated in FIG. 26 are as follows; $L_1 = 17$ mm, $L_2 = 8.5$ mm, $L_3 = 19$ mm, and $W_1 = W_2 = 1$ mm.

TABLE 3

| $t_1$ (mm) | 0.6 | 0.7 | 0.8 | 0.9 | 1.0 | 1.1 |
|---|---|---|---|---|---|---|
| $F_1$ (kg) | 2 | 2.5 | 3 | 3.5 | 4 | 4.5 |

Also, Table 4 shows a relation between the thickness $t_2$ defined between two grooves 27 and 27' and a force $F_2$ exerted to the tip of the tab 4a by which the Faston tab is begun to bend.

TABLE 4

| $t_2$ (mm) | 0.3 | 0.4 | 0.5 | 0.6 | 0.7 |
|---|---|---|---|---|---|
| $F_2$ (kg) | 2 | 2.5 | 3 | 3.5 | 4 |

Since, according to the experiment executed by inventors of the present invention, cracks near the first electrode 2 of the cylindrical dielectric 1 are caused when an external force larger than 4 Kg is exerted, the thickness $t_1$ between the grooves 27 and 27' must be equal to or smaller than 0.9 mm and the thickness $t_2$ between the grooves 26 and 26' must be equal to or smaller than 0.6 mm in order to absorb the external force effectively without causing cracks in the dielectric 1. However, the thicknesses $t_1$ and $t_2$ should have thicknesses proper for preventing the tab 4a or 4a' from bending by a usual external force to be exerted upon mounting the through type capacitor onto the magnetron or the electric cooking range or in the check process thereabout.

Further, it is to be noted that the through conductor becomes over heated by Toule heat caused by a current of about 10 (A) which flows upon driving the cooking range, if the thicknesses $t_1$ and $t_2$ are too thin. Also, the thicknesses are limited according to industrial standards regulated in respective countries. For example, $L_2$ must be equal to or larger than 7.9 mm according to British Standard (BS) and equal to or larger than 8 mm according to DIN standard.

Accordingly, it must be equal to or larger than 8 mm in order to satisfy respective industrial standard.

Figure 27:
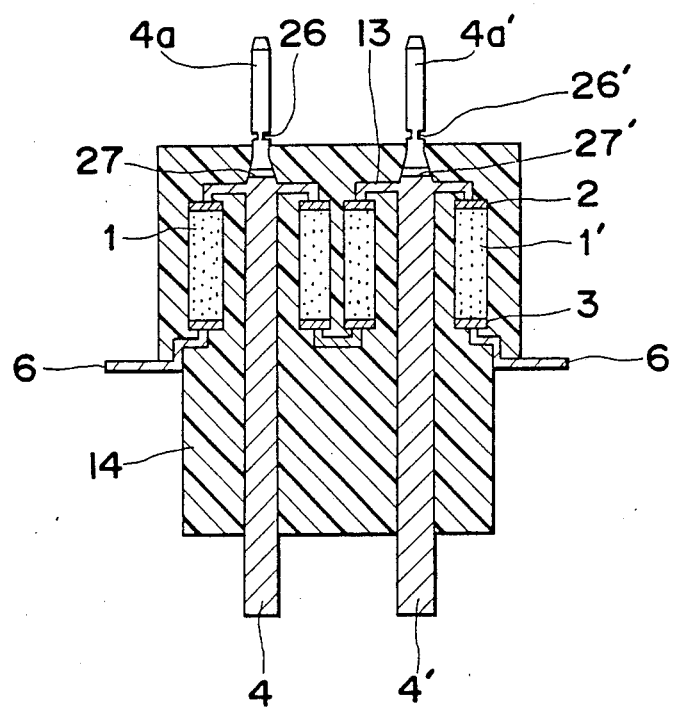
FIG. 27 is a cross-sectional view of the through type capacitor using the through conductor shown in FIGS. 26(a) and 26(b)

FIG. 27 shows an actual high voltage through type capacitor being comprised of two units using through conductors 4 and 4' as shown in FIG. 26.

Next, the eighth preferred embodiment of the present invention is explained.

This embodiment is intended to prevent harmonic components of the fundamental oscillation frequency of the magnetron mounted on the cooking range from leaking.

The high voltage through type capacitor can suppress leakage of high frequency electric wave in general but it can hardly suppress leakage of high harmonic components having frequencies higher than the ordinal high frequency wave. Especially, the fifth harmonic component of the fundamental component of the magnetron coincides partially with the frequency component utilized for the satellite broadcast and it is worried about that obstruction of the electric wave used for the satellite broadcast might be caused by the leaked fifth harmonic component.

Figure 28:
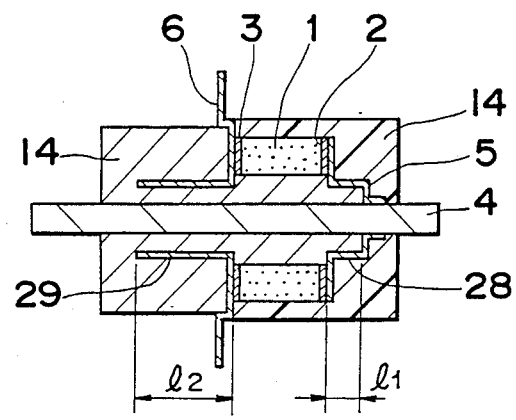
FIG. 28 is a cross-sectional view of the high voltage through type capacitor according to a further preferred embodiment of the present invention.

FIG. 28 shows the eighth preferred embodiment provided for suppressing the leakage of unnecessary high frequency components.

As shown therein, in this embodiment, there is formed a first choke element 28 integrally with the connection plate 5 which surrounds the through conductor 4 coaxially therewith by a predetermined length. The axial length $l_1$ of the first choke element 28 is determined so as to correspond to a wave length given by a product of a wave length of an arbitrary harmonic component for example, the fifth one of the fundamental oscillation frequency with the inverse of $4\sqrt{\epsilon\gamma}$ wherein $\epsilon\gamma$ is the relative dielectric constant of the insulating material used for molding.

It is also desirable to form a second choke element 29 surrounding the through conductor 4 integrally with the ground plate 6. The axial length $l_2$ of the second choke element 29 is determined so as to correspond to a product of a wave length of an arbitrary harmonic component, for example the second one, of the fundamental oscillation frequency with the inverse of $4\sqrt{\epsilon\gamma}$.

The fundamental oscillation frequency of the magnetron is 2,450 Hz and the relative dielectric constant $\epsilon\gamma$ of the insulating resin is about 3.

It is to be noted that either of the first and second choke elements 28 and 29 can be omitted and respective dimensions of them can be set in order to suppress arbitrary harmonic components other than the second and fifth hermanic components or to suppress noises of high frequency components other than harmonic components.

These choke means for suppressing high frequency noise are also applicable to the conventional high voltage through type capacitor shown in FIG. 33.

FIG. 29(a) and 29(b) show a ninth preferred embodiment of the present invention provided for improving the tracking resistance.

In this preferred embodiment the insulating resin 14 forms two, ellipsoidal cones 14A and 14B partitioned by the ground plate 6. Each of the ellipsoidal cones 14A and 14B has two wide surfaces 14a and 14a tapered from the ground plate 6 to the free end face 14b thereof.

Test for the tracking resistance is performed in the same manner as that employed in the fifth preferred embodiment of the present invention. Results of this test are shown in Table 5.

TABLE 5

| Sample | Time until discharge occurs | | | |
|---|---|---|---|---|
| No. | 1st | 2nd | 3rd | 4th |
| 1 | 49 min. | 58 min. | 200 min. or more | 200 min. or more |
| 2 | 43 min. | 200 min. or more | 200 min. or more | 200 min. or more |
| 3 | 35 min. | 45 min. | 40 min. | 200 min. or more |

As is apparent from comparison of Table 5 with Table 1, the tracking resistance of the through type capacitor having the structure shown in FIGS. 29(a) and 29(b) is much more improved than that of the fifth preferred embodiment of the present invention.

This is because water drops condensed on the wide taper surfaces 14a and 14a of the through type capacitor are easily flowed down due to the taper surface and an excellent water repellency of the silicone rubber.

Figure 30A:
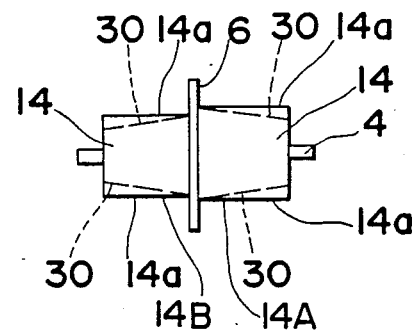
FIGS. 30(a) and 30(b) are respective side and front views of a high voltage through type capacitor according to a still further preferred embodiment of the present invention.
Figure 30B:
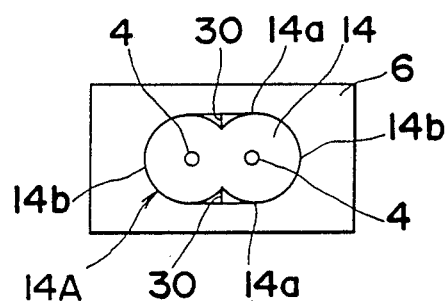

The through type capacitor shown in FIGS. 30a and 30b has two tapered grooves 30 and 30 formed along longitudinal center lines of wide surfaces 14a and 14a. These grooves serve to collect water drops condensed on respective wide surfaces 14 and 14a and collected water drop are drained from individual free ends of the bodies 14A and 14B.

Figure 31A:
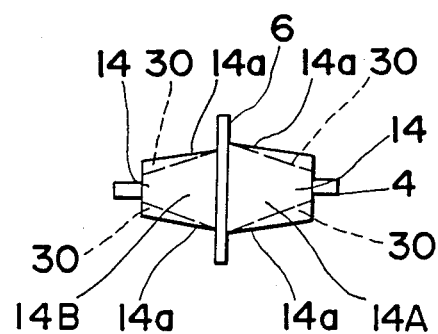
FIGS. 31(a) and 31(b) are respective side and front views of one more high voltage through type capacitors according to still a further preferred embodiment of the present invention.
Figure 31B:
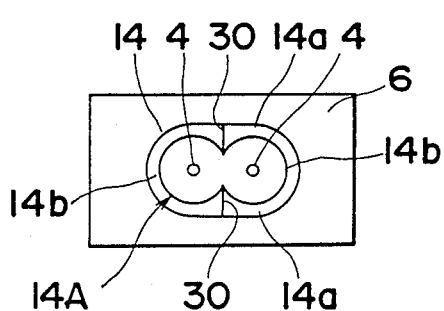

FIGS. 31(a) and 31(b) show another example of the ninth preferred embodiment of the present invention. In this example, tapered grooves 30 are formed along the longitudinal center line of each tapered wide surface 14a of individual ellipsoidal conic bodies 14A and 14B.

Figure 29:
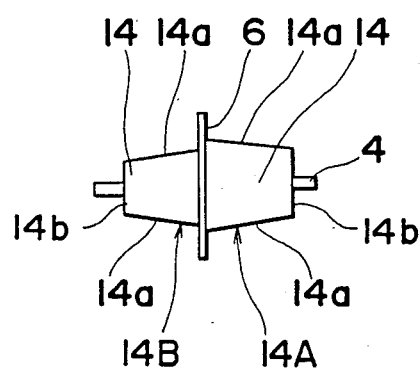
FIGS. 29(a) and 29(b) are respective side and front views of the high voltage through type capacitor according to a still further preferred embodiment of the present invention.
Figure 29:
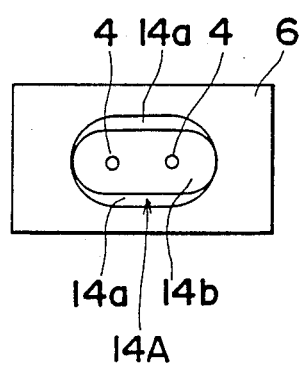

This structure is much more advantageous for detaining water drops when compared with two examples shown in FIGS. 29 and 30 since it possesses both merits of these.

Figure 32:
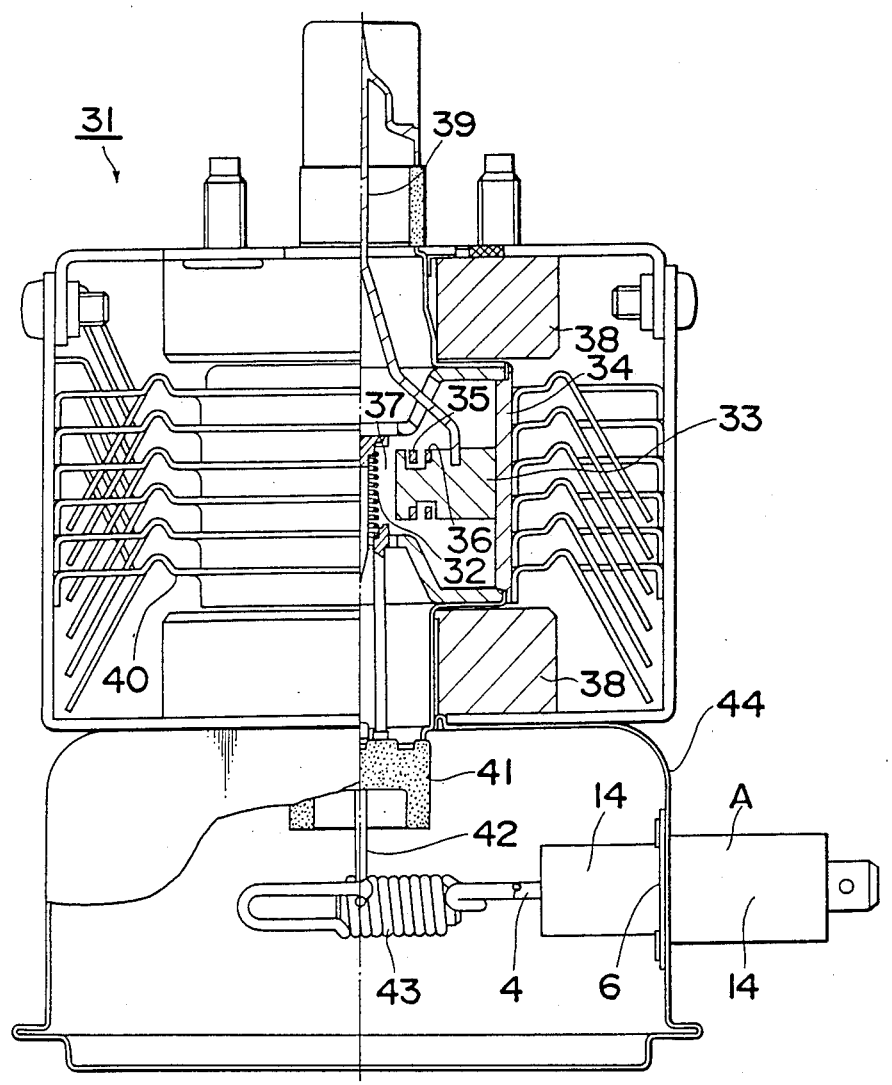
FIG. 32 is a partially sectioned front view of a magnetron in which the high voltage through type capacitor is mounted.

FIG. 32 shows a magnetron onto which the through type capacitor according to the present invention.

In the center portion of the magnetron 31, there is arranged a cathode 32. The cathode 32 has a filament for emitting electrons. Plural plate-like veins 33 made of oxygen free copper are arranged radially so as to surround the cathode 32.

These veins 33 are fixed on an inner wall of an anode cylinder 34 the base portion of which is made of oxygen free copper or are formed integrally with the anode cylinder 34.

On upper and lower ends of the vein 33, two inner strap springs 35 having the same diameter are arranged, respectively and two outer strap springs 36 having the same diameter which is larger than that of the inner strap springs 36 are also arranged, respectively. Each of inner and outer strap springs 35 and 36 is fixed to the vein 33 so as to short circuit the veins alternatively.

The space surrounded by the adjacent two veins 33 and the inner wall of the anode cylinder 32 forms a cavity resonator. In the center portion of the anode cylinder 34, a cylindrical space is formed by the tips of the veins 33 in the axial direction thereof. The cathode 32 is arranged in this cylindrical space.

The cylindrical space defined between the cathode 32 and the veins 33 is called action space 37. To this action space 37, a homogeneous D.C magnetic field is applied in parallel with the center axis of the cathode 32.

In order to generate the D.C magnetic field, magnets 38 and 38 are arranged above and below the anode cylinder 34. Further, a high voltage of D.C or low frequency is applied between the cathode 32 and the vein 33. An antenna conductor 39 is arranged so as for one end thereof to be connected to one of the veins 32.

In the structure mentioned above, a high frequency electrical field generated in the cavity resonator concentrates into the action space 37. Since the inner and outer strap springs connect the veins 33 alternatively, adjacent veins have reverse voltages with each other in a sense of high frequency.

Electrons emitted from the cathode 32 are drifted in the action space 37 so as to rotate around the cathode 32 and an interaction between the group of electrons and the high frequency electrical field. As a result of the interaction, microwaves are generated. Microwaves thus generated are guided outwardly through the antenna conductor 39 connected to the vein 33.

In the meanwhile, since the transforming efficiency to the microwave power is not 100%, a portion of the energy of the electron group is consumed as heat. In order to cool the magnetron, there are provided radiation fins 40 around the anode cylinder 35.

Also, a filter comprised of an inductor 43 and the through type capacitor A is connected to an cathode terminal 42 of the cathode of the cathode stem of the magnetron. This filter is completely surrounded by a shield case 44. A part of the shield case is used as a ground electrode 6 of the through type capacitor.

If various through type capacitors mentioned regarding respective preferred embodiments of the present invention are used as capacitors for the magnetron, it becomes possible to use the magnetron under a state of use severer than that of the conventional capacitor since the dielectric strength, heat resistance, thermal shock resistance and tracking resistance are improved according to the present invention.

In the conventional magnetron wherein there is a conventional through type capacitor, it is impossible to use it at a temperature higher than 150° C. due to the limit of the thermal resistance property of epoxy resin used as insulating resin 8 or 8'.

Accordingly, ti becomes necessary to cool the capacitor when used in the electrical cooking range and, therefore, it becomes necessary to make the cooking range have a higher cooling faculty.

Contrary to the above, the cooling faculty to the magnetron, when sued in the cooking range, is not so required as the conventional case.

Also, since epoxy resin used as insulating resin has a thermal expansion coefficient different from that of the ceramic dielectric, gaps are apt to form between the insulating resin and the dielectric due to temperature difference caused upon driving and stopping the magnetron.

These gaps make the dielectric strength and the thermal shock resistance worsen for a long time resulting in breaking down the capacitor. This may stop the oscillation of the magnetron.

Contrary to this, the through type capacitors according to the present invention, the reliability of the magnetron is greatly enhanced since the capacitor is free form break-down due to the improved dielectric strength and the heat shock resistance.

Further, polybutylene terephthalate resin used as the outer case 9 in the conventional capacitor has a weak water repellency and, thereby water is apt to condense on the surface of the outer case in the cold zone. This causes creeping discharges which worsen the tracking resistance.

Contrary to this, the capacitors according to the present invention exhibit high tracking resistance and, therefore, the reliability of the magnetron is enhanced in the col zone since it is free from the creeping discharge even if water is condensed on the surface thereof.

As it is apparent from these, the magnetron using the through type capacitor according to the present invention can have a good reliability when compared with that of the conventional one.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A high voltage through type capacitor comprising:
   a cylindrical dielectric;
   first and second electrodes formed on both end faces of said cylindrical dielectric;
   a through conductor passing through said cylindrical dielectric in an axial direction thereof, said through conductor is electrically connected to said first and second electrodes; and
   an insulating resin selected from the group of self-adhesive silicone rubber and elastic silicone gel, said insulating resin filled into a space defined at least between an inner surface of said cylindrical dielectric and said through conductor.

2. High voltage through type capacitor as claimed in claim 1, in which said through conductor provides a surface lubricant layer formed around a portion thereof surrounded by said cylindrical dielectric, said surface lubricant layer being made of a material which is hardly adhesive to said insulating material.

3. High voltage through type capacitor as claimed in claim 2, in which said surface lubricant layer is formed by Teflon coating.

4. High voltage through type capacitor as claimed in claim 2, in which said surface lubricant layer is formed by silicone grease.

5. High voltage through type capacitor as claim in claim 2, in which said surface lubricant layer is formed by a tube made of a material selected from the group of silicone and Teflon.

6. High voltage through type capacitor as claimed in claim 2, in which said surface lubricant layer is formed by a plated metal layer.

7. A high voltage through type capacitor comprising:
   a cylindrical dielectric;
   first and second electrodes formed on both end faces of said cylindrical dielectric;
   a through conductor passing through said cylindrical dielectric in an axial direction thereof, said through conductor is electrically conducted to said first electrode; and
   a ground conductor electrically conducted to said second electrode,
   wherein a space defined between an inner surface of said cylindrical dielectric and said through conductor is filled with self-adhesive silicone rubber, and
   wherein said through conductor, a portion of said ground conductor and outer surfaces of said cylindrical dielectric are covered by self-adhesive silicone rubber.

8. High voltage through type capacitor as claimed in claim 7, in which said through conductor and said around conductor are linearly contacted to said first and second electrodes, respectively.

9. A high voltage through type capacitor as claimed in claim 8, in which at least either of an end portion of said through conductor and an end portion of said ground plate to be connected to said first and second electrodes, respectively, is pointed so as to contact point-like when seen in a cross section thereof.

10. High voltage through type capacitor as claimed in claim 7, in which said through conductor provides a portion for absorbing an external force larger than a predetermined value by bending thereat when said external force is exerted to one end of said through conductor.

11. A high voltage through type capacitor comprising:
- a cylindrical dielectric;
- first and second electrodes formed on both end surfaces of said cylindrical dielectric;
- a through conductor passing through said cylindrical dielectric in an axial direction thereof, said through conductor is electrically conducted to said first electrode;
- a ground plate electrically connected to said second electrode; and
- insulating resin covering inner and outer surfaces of said cylindrical dielectric, a portion of said through conductor and a portion of said ground plate,
- wherein at least either one of said through conductor and said second electrode provides a choke structure formed coaxially with said through conductor, said choke structure has an axial length corresponding to $(\lambda/4\sqrt{\epsilon\gamma}$ where $\lambda$ is a wave-length of an arbitrary harmonic wave generated by a source of high frequency wave to which said high voltage through type capacitor is connected and $\epsilon\gamma$ is a relative dielectrical coefficient of said insulating resin.

12. A manufacturing method for manufacturing high voltage through type capacitors each of which comprises a cylindrical dielectric having first and second electrodes formed on both ends thereof, respectively, a through conductor to be electrically connected to said first electrode and a ground plate to be electrically connected to said second electrode, said manufacturing method comprises the steps of:
- molding said cylindrical dielectric, and said through conductor with insulating resin of silicone rubber;
- curing said silicone rubber at a relatively low temperature; and
- making an adhesive reaction of said cured silicone rubber by heating said silicone rubber up to a high temperature.

13. Manufacturing method as claimed in claim 12, further comprising step of performing creeping discharge treatment with respect to an outer surface of said silicone rubber.

14. A manufacturing method for manufacturing high voltage through type capacitors each of which comprises a cylindrical dielectric having first and second electrodes formed on both ends thereof, respectively, a through conductor to be electrically connected to said first electrode and a ground plate to be electrically connected to said second electrode, said manufacturing method comprises the steps of:
- molding said cylindrical dielectric and said through conductor with insulating resin of silicone rubber;
- curing said silicone rubber; and
- performing creeping discharge treatment with respect to an outer surface of said silicone rubber.

15. A high voltage through type capacitor comprising:
- a cylindrical dielectric;
- first and second electrodes formed on both end faces of said cylindrical dielectric;
- a through conductor passing through said cylindrical dielectric in an axial direction thereof, said through conductor is electrically connected to said first and second electrodes;
- a first insulating resin selected from the group of self-adhesive silicone rubber and elastic silicone gel, said first insulating resin filled into a space defined at least between an inner surface of said cylindrical dielectric and said through conductor; and
- a second insulating resin formed on an outside surface of said cylindrical dielectric.

16. A high voltage through type capacitor comprising:
- a cylindrical dielectric;
- first and second electrodes formed on both end faces of said cylindrical dielectric;
- a through conductor passing through said cylindrical dielectric in an axial direction thereof, said through conductor is electrically connected to said first and second electrodes;
- a first insulating resin selected from the group of self-adhesive silicone rubber and elastic silicone gel, said first insulating resin filled into a space defined at least between an inner surface of said cylindrical dielectric and said through conductor; and
- a second insulating resin covering upper and lower end faces of said first insulating resin.

17. A high voltage through type capacitor comprising:
- a cylindrical dielectric;
- first and second electrodes formed on both end faces of said cylindrical dielectric;
- a through conductor passing through said cylindrical dielectric in an axial direction thereof, said through conductor is electrically connected to said first and second electrodes;
- an insulating resin selected from the group of self-adhesive silicone rubber and elastic silicone gel, said insulating resin filled into a space defined at least between an inner surface of said cylindrical dielectric and said through conductor; and
- a surface lubricating layer in a form of a tube formed around said through conductor.

18. A high voltage through type capacitor comprising:
- a cylindrical dielectric;
- first and second electrodes formed on both end faces of said cylindrical dielectric;
- a through conductor passing through said cylindrical dielectric in an axial direction thereof, said through conductor is electrically conducted to said first electrode; and
- a ground conductor electrically conducted to said second electrode,
- wherein a space defined between in inner surface of said cylindrical dielectric and said through conductor is filled with a first self-adhesive silicone rubber, and
- wherein said through conductor, a portion of said ground conductor and outer surfaces of said cylindrical dielectric are covered by a second self-adhesive silicone rubber.

19. A high voltage through type capacitor comprising:
- a cylindrical dielectric;
- first and second electrodes formed on both end faces of said cylindrical dielectric;
- a through conductor passing through said cylindrical dielectric in an axial direction thereof, said through conductor is electrically conducted to said first electrode;
- a ground conductor electrically conducted to said second electrode;

wherein a space defined between an inner surface of said cylindrical dielectric and said through conductor is filled with self-adhesive silicone rubber, wherein said through conductor, a portion of said ground conductor and outer surfaces of cylindrical dielectric are covered by self-adhesive silicone rubber, and a second insulating resin covering upper and lower end faces of said self-adhesive silicone rubber.

20. A high voltage through type capacitor comprising:

a cylindrical dielectric;

first and second electrodes formed on both end faces of said cylindrical dielectric;

a through conductor passing through said cylindrical dielectric in an axial direction thereof, said through conductor is electrically conducted to said first electrode;

a ground conductor electrically conducted to said second electrode; and a surface lubricating layer in a form of a tube formed around said through conductor, wherein a space defined between an inner surface of said cylindrical dielectric and said through conductor is filled with self-adhesive silicone rubber, and wherein said through conductor, a portion of said ground conductor and outer surfaces of said cylindrical dielectric are covered by self-adhesive silicone rubber.

* * * * *

UNITED STATES PATENT AND TRADEMARK OFFICE
CERTIFICATE OF CORRECTION

PATENT NO. : 4,985,802
DATED : January 15, 1991
INVENTOR(S) : Katsunori UENO et al It is certified that error appears in the above-identified patent and that said Letters Patent is hereby corrected as shown below:

On the cover page, Item [30], change "Nov. 24, 1988 [JP] Japan 63-296932" to -- Aug. 11, 1989 [JP] Japan 1-208101 --.

Signed and Sealed this

Thirtieth Day of March, 1993

Attest:

STEPHEN G. KUNIN

*Attesting Officer*   Acting Commissioner of Patents and Trademarks